Nov. 19, 1935.    H. T. COTTRELL    2,021,574

GRAVITATIONAL BRAKE RELEASING MECHANISM

Filed Jan. 25, 1934

Inventor
Herbert T. Cottrell

By:
Albert E. Dieterich
Attorney

Patented Nov. 19, 1935

2,021,574

UNITED STATES PATENT OFFICE 2,021,574

GRAVITATIONAL BRAKE RELEASING MECHANISM

Herbert T. Cottrell, Vancouver, British Columbia, Canada

Application January 25, 1934, Serial No. 708,307
In Canada January 27, 1933

12 Claims. (Cl. 188—30)

This invention relates to a safety device to be used in conjunction with gravitational brakes and more especially with the gravitational brake for which I was granted United States Patent No. 1,863,556 on the 21st of June 1932.

My invention is more specifically a release mechanism that is built into the gravitational brake member and operable preferably by the foot brake lever whereby the release mechanism and wheel brakes are operated simultaneously.

It has been found that when a gravitational brake such as that described and illustrated in the above recited patent is installed on an automotive vehicle there is a liability of the brake jamming the gear shifts to such an extent that the same are very hard to move and throw out of mesh to engage a lower gear ratio when the car is being held from backward movement by the brake on a steep incline.

This is accounted for by reason of the fact that a simple gravitational brake, such as that set out in Patent No. 1,863,556 is only operable when the car or vehicle is in gear and is functionable in a direction opposite to that in which the gear shift is set for, i. e., when the gears are set for a forward direction the gravitational brake will prevent the car from running backwards, when the gears are set for a reverse direction, the gravitational brake will prevent the car from running forwards.

To illustrate a specific instance, assume that a gravitational brake, such as that referred to, is installed on a heavy truck, that such truck is carrying a full load up a steep incline and the driver has allowed his engine to become stalled through driving in an intermediate gear, the truck has come to a standstill and is held from running backwards by the gravitational brake; but in so holding the truck from backward movement the strain is distributed from the back driving wheels through the transmission shaft to the connected gears of the gear shift, thence to the clutching surfaces of the gravitational brake member.

Now, under such conditions, the driver may set his foot brake or his emergency brake, but neither will relieve the gravitational brake or the connected gears of the heavy strain they are subjected to by reason of the weight and load of the truck and the pitch of incline they are stalled upon. In consequence it becomes difficult to unclutch the connected gears through the gear shift lever by reason of the strain thrown upon them.

It is one of the objects of my present invention to remove the difficulty and strain of shifting gears under the circumstances recited.

It is another object of my present invention to prevent undue strain being set up on the operative mechanism of a car fitted with a gravitational brake through carelessness of the driver shifting from a forward direction to a reverse direction before the car has come to a stop. I accomplish this by providing mechanism that positively prevents the movement of the gear shift lever from a forward to a reverse direction, or vice versa, without first bringing the car to a stop by use of the wheel brakes.

The safety features of my present invention are exemplified by reason that it prevents, first, the jamming of the gear shift by stalling the motor and car; second, that it prevents undue strain being thrown upon the operative mechanism of the car by locking the gear shift mechanism while the car is in motion.

My present invention not only includes the mechanism but the method of releasing the gravitational brake by application of the ordinary wheel brakes to relieve the strain upon the gear changing mechanism.

My invention is fully set out and described in the following specification and illustrated in the accompanying drawing forming part of this application, in which.

Figures 5, 6, 7:
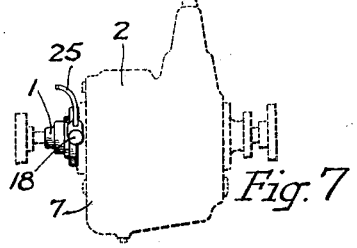
Figure 5 is a detail side elevation of the toggle.
Figure 6 is an end elevation of the toggle.
Figure 7 is a diagrammatic elevation of a gear shift mechanism showing the application of the gravitational brake mechanism thereto.

In this drawing like numerals indicate like parts, and the numeral 1 indicates a cover for a gravitational brake installed on the front end of a gear shifting mechanism 2 shown in Figure 7.

The gravitational brake proper comprises a flanged sleeve member 3 having a screw thread 4 formed on the exterior of the sleeve portion adapted to engage the screw threaded flanged nut member 5. The flanged sleeve member 3 is bored and splined to fit the splined pinion shaft 6 extending through the front end of the gear changing housing 7.

Mounted upon the sleeve portion of the flanged sleeve member 3 is a ratchet disc member 8 having ratchet teeth 9 formed on its outer periphery. The face or faces of said disc member may be serrated, as at 10, if desired to provide additional gripping surface.

The disc member 8 is mounted between the clutching faces of the flanged sleeve member 3 and the screw threaded flanged nut member 5 and is adapted to engage the clutching faces to bring the gravitational brake members 3 and 5 into operation.

Mounted adjacently to the ratchet toothed periphery of the disc member 8 is a pawl 11 pivoted off centre, whereby it is always in contact with the ratchet teeth 9 of the disc member 8. Contacting the circumferential head of the pawl 11 is one end of a toggle 12, the centre of which is fulcrumed upon a yoke 13 connected to the end of a piston rod 14 secured to a piston 15 operable in a hydraulic cylinder 16 which may be formed integral on the end of the gear change housing 7.

Figure 3:
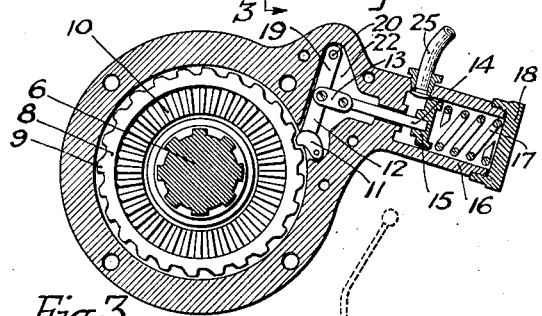
Figure 3 is a cross section taken on the line 3—3 of Figure 1 and shows the pawl release toggle and operating cylinder.
Figure 4:
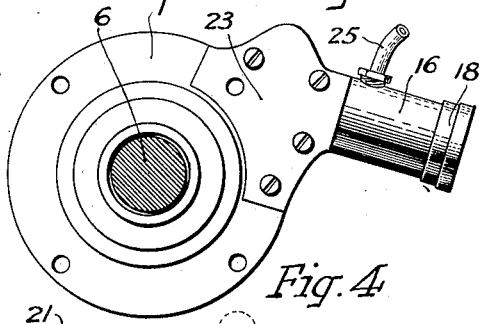
Figure 4 is an end plan of the housing and cylinder shown in Figure 3.

A stiff spring 17 is mounted in the cylinder 16 between the piston 15 and the cover 18, whereby the piston rod 14 is always in the extended position shown in Figure 3.

The upper end 19 of the toggle is of two parts secured together by a pin or rivet 20 and has a spacer 21 between of the thickness of the knuckle joint of the lower section of the toggle lever.

The upper end 19 of the toggle is free to rock in its housing 22 when it is collapsed by action of the piston rod 14; hence the movement is very slight, but a powerful action results by reason of the compound action of the toggle which is sufficient at all times and under any load condition to free the pawl 11 from the ratchet disc member 8 when the piston 15 is acted upon by hydraulic pressure. A separate cover plate 23 is provided to cover the housing 22.

Figure 8:
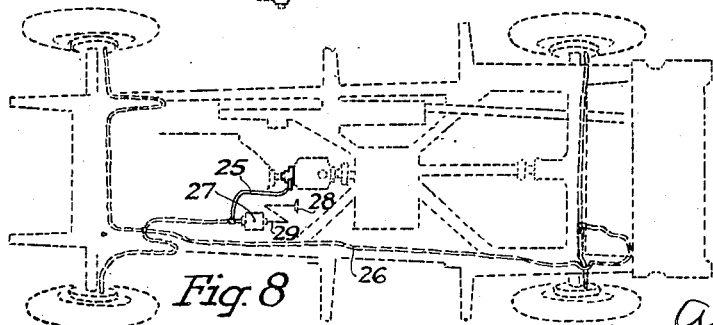
Figure 8 is a dotted outline plan view of an automobile chassis showing the hydraulic distributing system for energizing the brakes connected to the pressure cylinder operated by the foot brake lever of the car. This view shows a connection from the main pressure line to the hydraulic cylinder operating the toggle of the gravitational brake mechanism.

A hydraulic tubing connection 25 is secured upon the cylinder 16 which is connected to the main line 26 of the hydraulic distribution system of the car shown in Figure 8. The line 26 is connected to a pressure cylinder 27 actuated by the foot brake lever 28 through the rod 29.

Under all normal driving conditions the disc member 8 is held stationary and prevented from rotating by the pawl 11 which in turn is held in direct contact with the ratchet teeth 9 of the disc 8 by the toggle 12 which in turn is held in the fully extended position by the yoke 13 and piston rod 14 and piston 15 being acted upon by the spring 17 in the cylinder 16.

Figure 1:
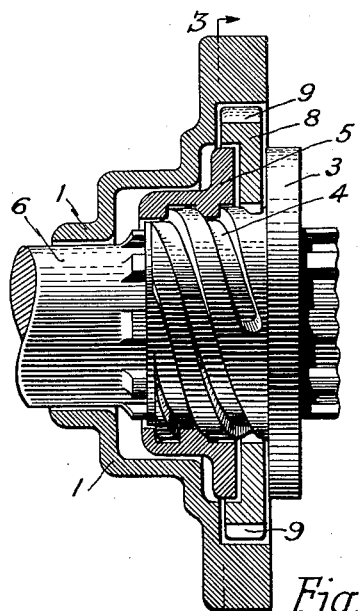
Figure 1 is a detail sectional elevation of the gravitational brake mechanism as installed upon the end of the gear shift housing adjacent the motor.
Figure 2:
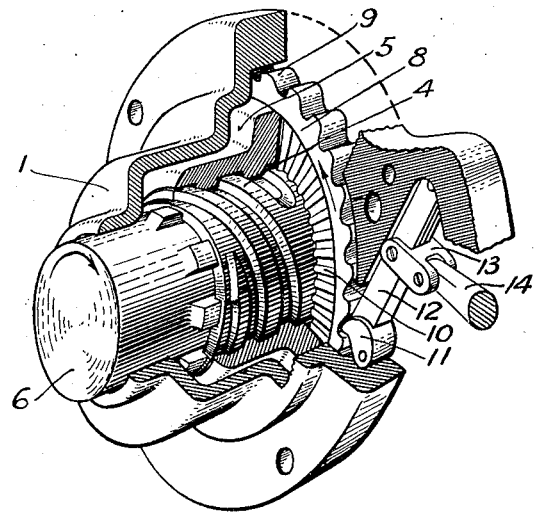
Figure 2 is an isometric view with the cutaway portions to illustrate the parts in relation.

The spring 17 is selected and is of such strength that the pressure set up in the main line 26 of the hydraulic distribution system of the car for the ordinary operation of the hydraulic foot brakes is not high enough to operate the piston 15 of the release mechanism of the gravitational brake, as the spring 17 exerts at all times a pressure upon the piston 15 a little higher than the hydraulic pressure required to operate the wheel brakes, and thus holds the toggle 12 in the fully extended position shown in Figures 2 and 3, thereby holding the pawl 11 in contact with the disc 8 to prevent rotation.

To clarify this point more, which is an important one, I assume the wheel brakes require a hydraulic pressure of say, thirty pounds, to fully energize them, then it will take about thirty-five or forty pounds pressure to energize the piston 15 of the cylinder 16 to move against the pressure of the spring 17 to collapse the toggle 12, thereby releasing the pawl 11 from the disc 8 to free the gravitational brake of all strain, assuming the gravitational brake is functioning under conditions as set out in paragraphs 5 and 6 of this specification.

With the freeing of the disc member 8 the pinion shaft 6 and inter-connected gear mechanism is freed of all strain set up from the back wheels and the two gripping members 3 and 5 are allowed to partially disengage through movement of the disc 8, as such movement permits of an "unscrewing" action of the nut and sleeve members 5 and 3.

The additional hydraulic pressure required to actuate the release mechanism of the brake is attained by the driver exerting a higher foot pressure upon the foot brake lever 28 than is required to energize the wheel brakes, so that higher hydraulic pressure is built up in the pressure cylinder 27 connected to the foot brake lever 28 by the rod 29.

In operation the gravitational brake release device works as follows:

Assuming a condition has arisen such as that described in paragraphs 5 and 6 of this specification and that a heavy truck fully loaded on an incline has become stalled with the consequence that the entire load of the truck is thrown upon the gravitational brake to prevent it running backwards. This action prevents movement of the gear shift lever through the strain set up upon the interconnected transmission mechanism from the rear wheels through their tendency to run backwards.

To counteract such a condition, all that it is necessary to do is for the driver to set his wheel brakes with a pressure upon the foot lever a little heavier than is required to fully set and hold his wheel brakes, the object of the heavier foot pressure being to build up a little higher hydraulic pressure in the hydraulic distribution main to operate the hydraulic release cylinder 16, whereby the release mechanism of the gravitational brake is freed, allowing the brake and transmission mechanism full freedom as the load is now distributed to the wheel brakes, which permits the driver to select any gear ratio as the transmission is free of all strain.

Having now described my invention, what I claim and desire to be protected in by Letters Patent, is:

1. In an automotive vehicle, a gravitational brake mechanism having clutching faces comprising in combination with such a brake mechanism, a floating disc member normally held from rotation, said disc member being mounted between the clutching faces of said brake mechanism to engage said faces to bring said brake mechanism into operation, and means for releasing said disc member for free rotation.

2. In an automotive vehicle, a gravitational brake mechanism having clutching faces comprising in combination with such a brake mechanism, a floating ratchet disc member, said disc member having a pawl in engagement therewith and being mounted between the clutching faces of said brake mechanism to engage said faces to bring said brake mechanism into operation, and means for releasing said pawl from said ratchet disc member.

3. In an automotive vehicle, a gravitational brake mechanism having clutching faces comprising in combination with such a brake mechanism, a floating ratchet disc member, said disc member having a pawl in engagement therewith to hold said disc member stationary, said disc member mounted between the clutching faces of said brake mechanism to engage said faces to bring said brake mechanism into operation, and means for releasing said pawl from said disc member.

4. In an automotive vehicle, a gravitational brake mechanism having clutching faces comprising in combination with such a brake mechanism, a floating ratchet disc member mounted between the clutching faces of said brake mechanism to engage said faces to bring said brake mechanism into operation, a pawl engaging said disc member, a link engaging said pawl, operating means engaging said link, said operating means being operable by the wheel brake actuating mechanism of said vehicle, and means for releasing said pawl from said disc member.

5. In an automotive vehicle, a wheel brake actuating mechanism a gravitational brake mechanism comprising in combination with such a brake mechanism, a floating ratchet disc member engaging said brake mechanism to bring said brake mechanism into operation, a pawl engaging said disc member, a toggle engaging said pawl, operating means engaging said toggle, said operating means being operable by the wheel brake actuating mechanism of said vehicle and in timed relation therewith, and means for releasing said pawl from said disc member.

6. In an automotive vehicle, a wheel brake actuating mechanism a gravitational brake mechanism comprising in combination with such a brake mechanism, a floating ratchet disc member engaging said brake mechanism to bring said brake mechanism into operation, a pawl engaging said disc member, a toggle engaging said pawl, operating means engaging said toggle, said operating means being operable by the wheel brake actuating mechanism of said vehicle and in timed relation therewith, and means for releasing said pawl from said disc member, said means being responsive to movement of said wheel brake actuating mechanism whereby said movement is communicated to said operating means engaging said toggle and said toggle is caused to engage said pawl to disengage the latter from said disc member whereby said disc member is free to move.

7. In an automotive vehicle, a gravitational brake mechanism having clutching faces comprising in combination with such a brake mechanism, a floating disc member normally held from rotation, said disc member being mounted between the clutching faces of said brake mechanism to engage said faces to bring said brake mechanism into operation, and hydraulic means for releasing said disc member for free rotation.

8. In an automotive vehicle, a gravitational brake mechanism having clutching faces comprising in combination with such a brake mechanism, a floating ratchet disc member, said disc member having a pawl in engagement therewith and being mounted between the clutching faces of said brake mechanism to engage said faces to bring said brake mechanism into operation, and hydraulic means for releasing said pawl from said ratchet disc member.

9. In an automotive vehicle, a gravitational brake mechanism having clutching faces comprising in combination with such a brake mechanism, a floating ratchet disc member, said disc member having a pawl in engagement therewith to hold said disc member stationary, said disc member mounted between the clutching faces of said brake mechanism to engage said faces to bring said brake mechanism into operation, and hydraulic means for releasing said pawl from said disc member.

10. In an automotive vehicle, a gravitational brake mechanism having clutching faces comprising in combination with such a brake mechanism, a floating ratchet disc member mounted between the clutching faces of said brake mechanism to engage said faces to bring said brake mechanism into operation, a pawl engaging said disc member, a link engaging said pawl, operating means engaging said link, said operating means being operable by the wheel brake actuating mechanism of said vehicle, and hydraulic means for releasing said pawl from said disc member.

11. In an automotive vehicle, a wheel brake actuating mechanism a gravitational brake mechanism comprising in combination with such a brake mechanism, a floating ratchet disc member engaging said brake mechanism to bring said brake mechanism into operation, a pawl engaging said disc member, a toggle engaging said pawl, operating means engaging said toggle, said operating means being operable by the wheel brake actuating mechanism of said vehicle and in timed relation therewith, and hydraulic means for releasing said pawl from said disc member.

12. In an automotive vehicle, a wheel brake actuating mechanism a gravitational brake mechanism comprising in combination with such a brake mechanism, a floating ratchet disc member engaging said brake mechanism to bring said brake mechanism into operation, a pawl engaging said disc member, a toggle engaging said pawl, operating means engaging said toggle, said operating means being operable by the wheel brake actuating mechanism of said vehicle and in timed relation therewith, and hydraulic means for releasing said pawl from said disc member, said means being responsive to movement of said wheel brake actuating mechanism whereby said movement is communicated to said operating means engaging said toggle and said toggle is caused to engage said pawl to disengage the latter from said disc member whereby said disc member is free to move.

HERBERT T. COTTRELL.